United States Patent
Cochran et al.

(10) Patent No.: US 6,701,324 B1
(45) Date of Patent: *Mar. 2, 2004

(54) DATA COLLECTOR FOR USE IN A SCALABLE, DISTRIBUTED, ASYNCHRONOUS DATA COLLECTION MECHANISM

(75) Inventors: Stephen Thomas Cochran, Austin, TX (US); Raghavendra Krishnamurthy, Austin, TX (US); Michael Mallo, Austin, TX (US); Vinod Thankappan Nair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,627

(22) Filed: Jun. 30, 1999

(51) Int. Cl.[7] ............................................... G06F 17/30
(52) U.S. Cl. ..................................................... 707/104.1
(58) Field of Search .................................. 707/102, 103, 707/103 R, 104.1, 10, 3; 709/217, 224; 717/103, 108; 705/7

(56) References Cited

U.S. PATENT DOCUMENTS 6,374,254 B1 * 4/2002 Cochran et al. ............ 707/102
6,418,445 B1 * 7/2002 Moerbeek ............... 707/103 X
6,421,676 B1 * 7/2002 Krishnamurthy et al. ... 707/102

* cited by examiner

Primary Examiner—Charles Rones
Assistant Examiner—Apu M Mofiz
(74) Attorney, Agent, or Firm—Marilyn Smith Dawkins; Brace & Patterson, L.L.P.

(57) ABSTRACT

A collector for distributed data collection includes input and output queues employed for priority based queuing and dispatch of data received from endpoints and downstream collector nodes. Collection Table of Contents (CTOC) data structures for collection data are received by the collector from the endpoints or downstream collectors and are placed in the input queue, then sorted by the priority within the CTOC. Within a given priority level, collection of the data is scheduled based on the activation time window within the CTOC, which specifies the period during which the endpoint or downstream collector node will be available to service data transfer requests. The collected data, in the form of data packs and constituent data segments, is stored in persistent storage (depot). A CTOC is then transmitted to the next upstream collector node. Network bandwidth utilization is managed by adjusting the activation time window specified within a CTOC and the route employed between source and recipient.

26 Claims, 6 Drawing Sheets

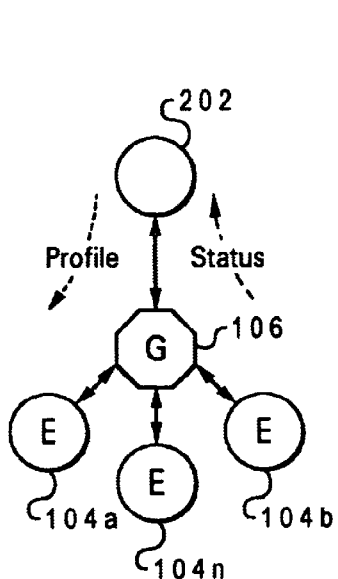
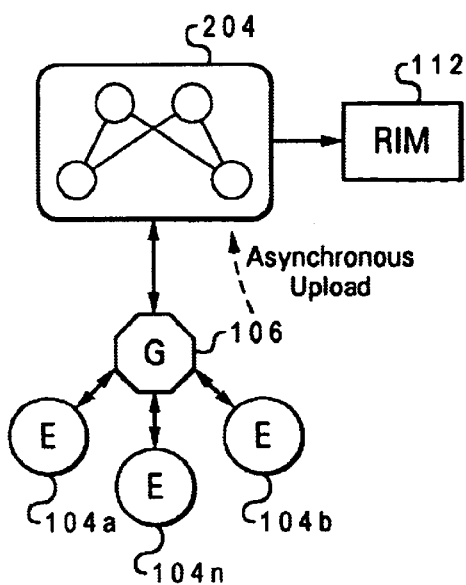
Fig. 2A    Fig. 2B
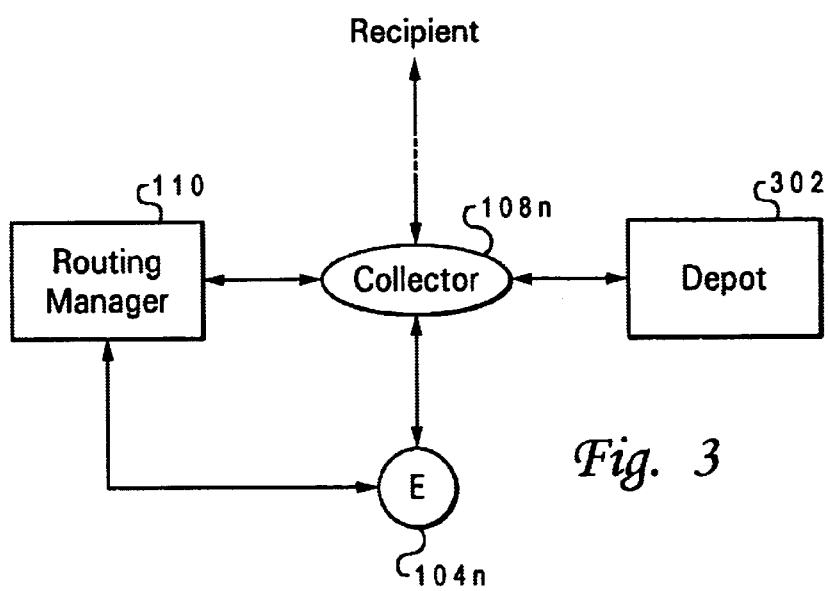
Fig. 3

DATA COLLECTOR FOR USE IN A SCALABLE, DISTRIBUTED, ASYNCHRONOUS DATA COLLECTION MECHANISM

RELATED APPLICATIONS

The present invention is related to the subject matter of the following commonly assigned, U.S. patent applications: Ser. No. 09/345,626 now U.S. Pat. No. 6,374,254 entitled "A SCALABLE, DISTRIBUTED, ASYNCHRONOUS DATA COLLECTION MECHANISM" and filed Jun. 30, 1999; and Ser. No. 09/345,628 now U.S. Pat. No. 642,626 entitled "SCHEDULER FOR USE IN A SCALABLE, DISTRIBUTED, ASYNCHRONOUS DATA COLLECTION MECHANISM" and filed Jun. 30, 1999. The content of the above-identified applications is incorporated herein by reference.

BACKGROUND OF THE INVENTION

1. Technical Field

The present invention generally relates to collectors for collection of data from nodes in distributed networks and in particular to collectors providing asynchronous collection of large blocks of data from distributed network nodes. Still more particularly, the present invention relates to collectors implementing a scalable, distributed data collection mechanism.

2. Description of the Related Art

Distributed applications which operate across a plurality of systems frequently require collection of data from the member systems. A distributed inventory management application, for example, must periodically collect inventory data for compilation from constituent systems tracking local inventory in order to accurately serve inventory requests.

Large deployments of distributed applications may include very large numbers of systems (e.g., than 10,000) generating data. Even if the amount of data collected from each system is relatively small, this may result in large return data flows. For instance, if each system within a 20,000 node distributed application generates only 50 KB of data for collection, the total data size is still approximately 1,000 MB.

Current synchronous approaches to data collection in distributed applications typically follow a "scan" methodology illustrated in FIG. 6. In this approach, a centralized data collector (or "scan initiator") 602 initiates the data collection by transmitting a set of instructions to each node or member system 604a–604n through one or more intermediate systems 606, which are typically little more than a relay providing communications between the central data collector 602 and the member systems 604a–604n. The central data collector 602 must determine hardware and software configuration information for the member systems 604a–604n, request the desired data from the member systems 604a–604n, and receive return data via the intermediate system(s) 606. The data received from the member systems 604a–604n is then collated and converted, if necessary, and forwarded to a relational interface module (RIM) 608, which serves as an interface for a relational database management system (RDBMS).

In addition to not being readily scalable, this approach generates substantial serial bottlenecks on both the scan and return side. Even with batching, the number of member systems which may be concurrently scanned must be limited to approximately 100 in order to limit memory usage. The approach also limits exploitable parallelism. Where a five minute scan is required, 20,000 nodes could all be scanned in just five minutes if the scans could be performed fully parallel. Even in batches of 100, the five minute scans would require 1,000 minutes to complete. The combination of the return data flow bottleneck and the loss of scan parallelism creates a very large latency, which is highly visible to the user(s) of the member systems.

Current approaches to data collection in distributed applications also employ Common Object Request Broker Architecture (CORBA) method parameters for returning results to the scan initiator 602. This is inefficient for larger data sizes, which are likely to be required in data collection for certain information types such inventory or retail customer point-of-sale data.

Still another problem with the existing approach to data collection is that nodes from which data must be collected may be mobile systems or systems which may be shut down by the user. As a result, certain nodes may not be accessible to the scan initiator 602 when data collection is initiated.

It would be desirable, therefore, to provide a collector which may be utilized to implement a scalable, efficient data collection mechanism for a distributed environment. It would further be advantageous for the collectors to provide priority based queuing for collection requests, data rate matching to available bandwidth, and collection transfer control cooperating with other distributed applications for optimization of bandwidth utilization.

SUMMARY OF THE INVENTION

It is therefore one object of the present invention to provide collectors for collection of data from nodes in distributed networks.

It is another object of the present invention to provide collectors providing asynchronous collection of large blocks of data from distributed network nodes.

It is yet another object of the present invention to provide collectors implementing a scalable, distributed data collection mechanism.

The foregoing objects are achieved as is now described. A collector for distributed data collection includes input and output queues employed for priority based queuing and dispatch of data received from endpoints and downstream collector nodes. Collection Table of Contents (CTOC) data structures for collection data are received by the collector from the endpoints or downstream collectors and are placed in the input queue, then sorted by the priority within the CTOC. Within a given priority level, collection of the data is scheduled based on the activation time window within the CTOC, which specifies the period during which the endpoint or downstream collector node will be available to service data transfer requests. The collected data, in the form of data packs and constituent data segments, is stored in persistent storage (depot). A CTOC is then transmitted to the next upstream collector node. Network bandwidth utilization is managed by adjusting the activation time window specified within a CTOC and the route employed between source and recipient.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A–2B are diagrams of portions of the distributed data collection mechanism relevant to different phases of the data collection process in accordance with a preferred embodiment of the present invention;

FIG. 3 is a diagram of components of a distributed data collection mechanism employed in a collection process in accordance with a preferred embodiment of the present invention;

DETAILED DESCRIPTION OF THE PREFERRED EMBODIMENT

Figure 1A:
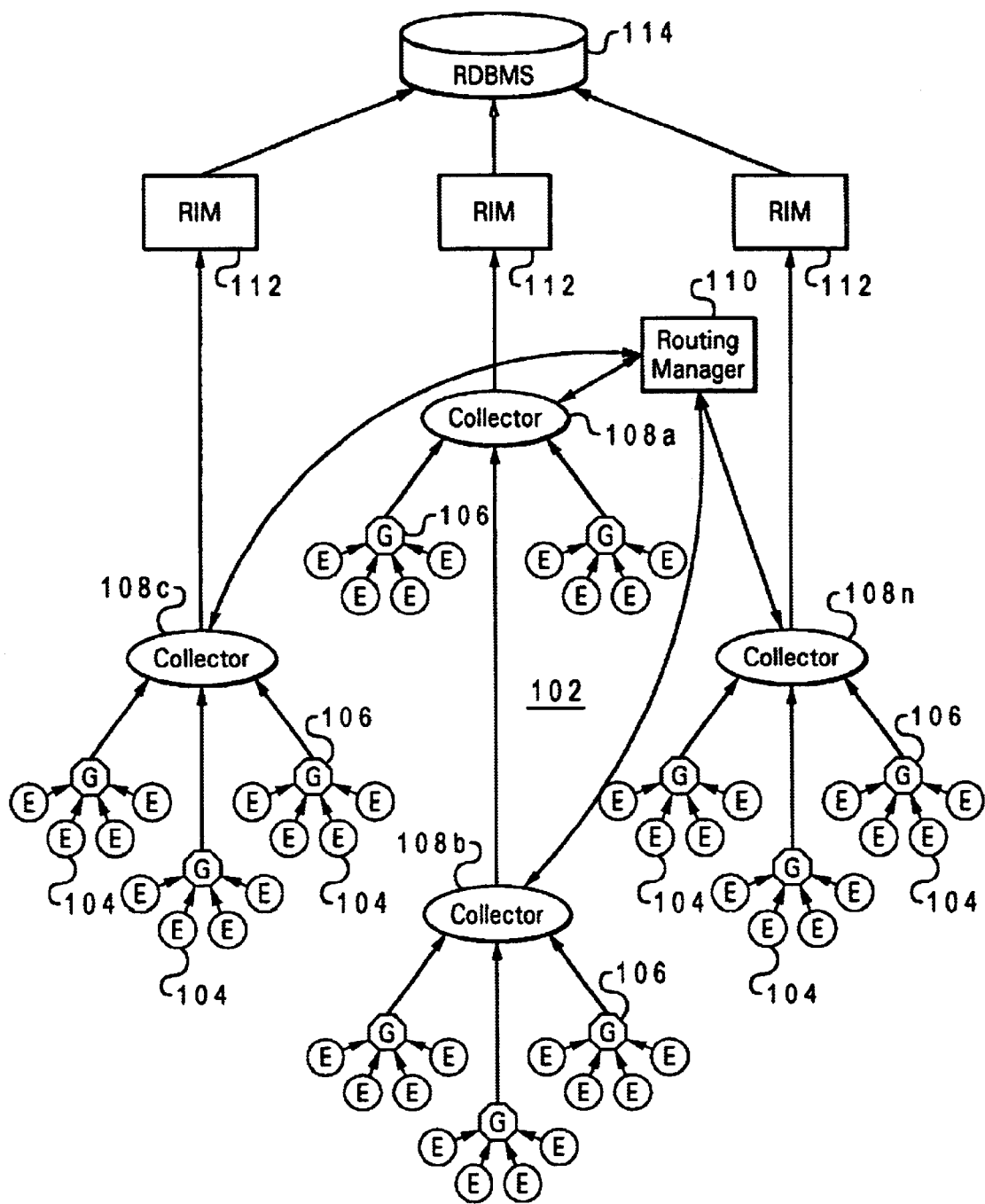
FIGS. 1A–1B depict diagrams of a distributed data collection mechanism in accordance with a preferred embodiment of the present invention.
Figure 1B:
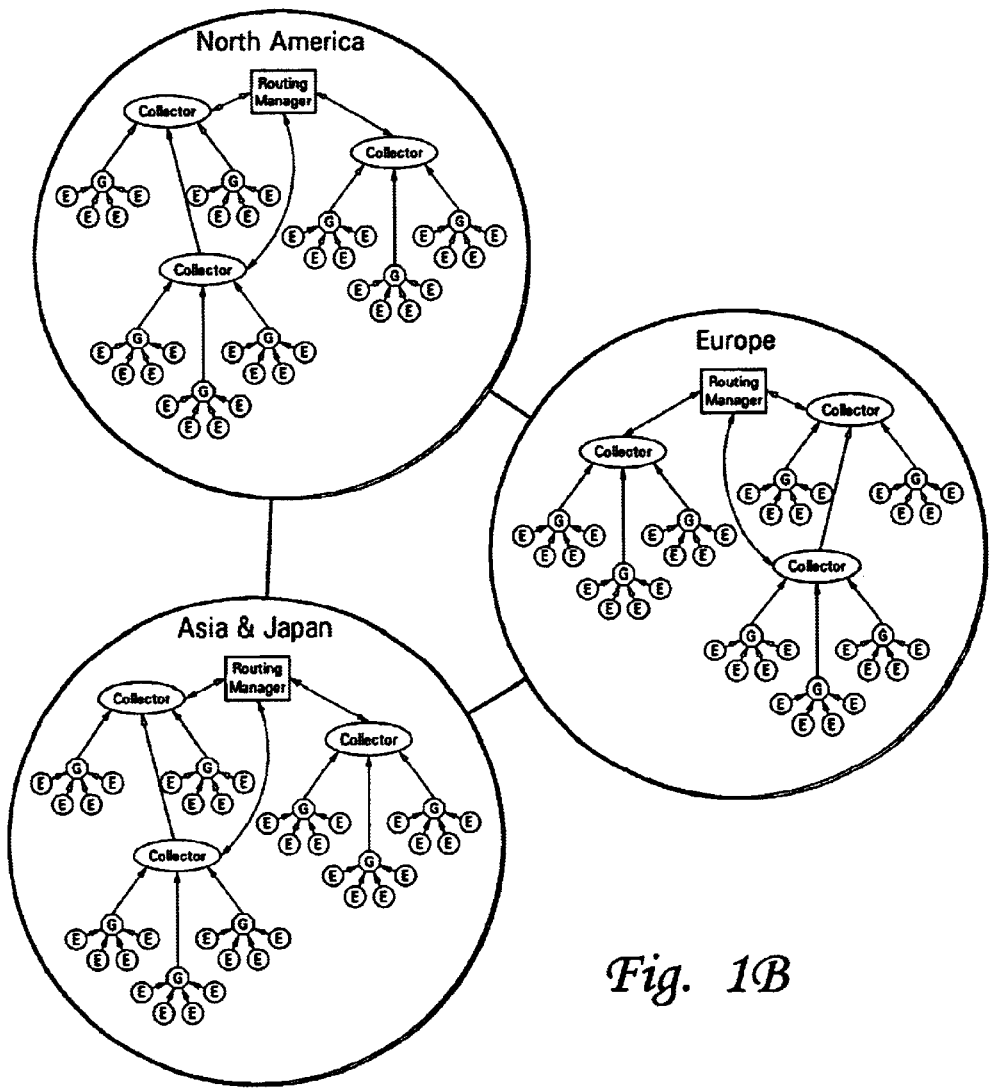

With reference now to the figures, and in particular with reference to FIGS. 1A and 1B, diagrams of a distributed data collection mechanism in accordance with a preferred embodiment of the present invention are depicted. Distributed data collection mechanism 102 is implemented within a network of data processing systems including endpoints ("E") 104 coupled via gateways ("G") 106 to collectors 108a–108n.

The network of data processing systems in which distributed data collection mechanism 102 is implemented may be either homogeneous or heterogeneous, and may form a local area network (LAN) or include two or more LANs connected to form a wide area network (WAN) or global area network. The network of data processing systems preferably includes an environment for running distributed applications, such as Tivoli Management Environment (TME) available from Tivoli Systems, Inc. of Austin, Tex.

Endpoints 104, which may also be referred to as "sources," are the systems from which data is to be collected. Gateways 106 are systems which facilitate communications between endpoints 104 and collectors 108a–108n and/or routing manager 110. Recipients are objects or processes that receive collected data, and may be collectors 108a–108n or relational interface modules ("RIMs") 112.

Collectors 108a–108n are objects or processes which perform the task of data collection from a fixed set of endpoints 104. The primary objective for collectors 108a–108n is to collect data from all corresponding endpoints 104 assigned to route data to the respective collector 108a–108n, and store the received data in a persistent depot until another collector or the ultimate recipient is ready to receive the collected data. Data is collected based on certain characteristics such as priority, availability of the source (endpoint 104 or collector 108a–108n), and bandwidth usage. A collector 108a–108n may collect data from endpoints 104 or from another collector (e.g., collectors 108a and 108n in the example depicted). A collector 108a–108n may transfer data to another collector or to the recipient of the collection.

Routing manager 110 is a centralized module which manages collectors 108a–108n and the routes from endpoints 104 through collectors 108a–108n to the recipients of the collection, relational interface modules ("RIMs") 112 and relational database management system ("RDBMS") 114. The primary function of routing manager 110 is to manage the deployment of collectors 108a–108n and maintain the routes from endpoints 104 through collectors 108a–108n to the recipients of the collection. Each routing manager 110 will service several collectors 108a–108n, although for scalability an enterprise may include several routing managers 110. FIG. 1B illustrates one circumstance under which multiple routing managers would be desirable: where the data collection includes networks spanning multiple continents.

Collectors 108a–108n, routing manager 110, RIMs 112 and RDBMS 114 may all run on a single system or may be distributed among a plurality of systems. Although the exemplary embodiment depicts a one-to-one correspondence between collectors 108a–108n and RIMs 112, multiple collectors 108a–108n may be coupled to a single RIM 112, and a single collector 108a–108n may be coupled to multiple RIMs 112 for separate databases. Endpoints 104 may be continuously coupled to the network hosting distributed data collection mechanism 102, or they may be mobile systems only occasionally connected to the network. Endpoints 104 may be continuously powered on or may have periods during which they are turned off.

Referring to FIGS. 2A and 2B, diagrams of portions of the distributed data collection mechanism relevant to different phases of the data collection process in accordance with a preferred embodiment of the present invention are illustrated. In the present invention, the "scan" phase of the data collection process is decoupled from the gathering of return results. FIG. 2A illustrates the "scan" phase of the data collection process. In the present invention, each endpoint 104a–104n includes an autonomous scanner, allowing scans to proceed fully parallel. During the "scan" phase, a central "scan initiator" module 202, which may be part of the routing manager, merely performs a profile push to the endpoints 104a–104n without waiting for return data. Some status data may be returned by endpoints 104a–104n to central module 202, but the data to be collected is not returned to central module 202 in response to the profile push.

Instead, as illustrated in FIG. 2B, "return" or collection data (the data being collected) is asynchronously uploaded by individual endpoints 104a–104n to a collection network 204, consisting of collectors associated with endpoints 104a–104n, which routes the data to RIM 112. Transfer of the collection data is thus initiated by the endpoints 104a–104n rather than a centralized module 202. Stated differently, the actual data collection is initiated from the bottom up rather than from the top down.

The profile pushes from central module 202 are infrequent, needed only to set or change the scanner configuration at endpoints 104a–104n. Scanners may be set to run automatically on a daily/weekly schedule or on some other schedule, or in response to an event (including a synchronous scan request from the user), or on boot-up. Scan data is subsequently queued for asynchronous collection.

In its simplest form, collection network 204 may simply be an upcall-collector at each gateway 106 within the distributed data collection mechanism 102, with uploads from endpoints 104a–104n routed from the gateway 106 directly to the RIM 112. However, this implementation may result in a potentially large load on gateway 106. For a gateway 106 servicing 1,000 endpoints 104a–104n, each generating 50K of collection data, the total load on gateway 106 will be 50 MB. Data collection in this case will be competing with data distributions on gateway 106 in which data is flowing downstream.

Another drawback with this implementation is that gateways are not generally RIM hosts, which means that unless a custom RIM method is implemented, data flowing from gateway 106 to RIM 112 will be based on CORBA method parameters. Furthermore, wire-transfer overhead is potentially added to the RIM write, in addition to RIM latency. This implementation also provided less control over return data path and less coordination between RIM writers.

A more scalable solution is provided where collection network 204 is implemented with a configurable topology, using collectors nodes instead of simple upcall-collectors as basic elements. Collector nodes can be connected together to form a collection network topology, and can provide additional functionality such as depoting (caching), bandwidth control, and transfer scheduling. Deployment of collector nodes is controlled by the customer, so that the user may choose a simple topology if that is sufficient or, for larger deployments, add additional managed collector nodes to the topology to scale up the amount of data which can be buffered and improve response time visible to endpoints 104a–104n for queuing collection requests. Since collector nodes are not hard coded to gateways, application-specific topology customization becomes possible for, e.g., strategic placement of destination collectors on the RIM host for inventory so that wire-transfer overhead in the RIM object call is eliminated.

Each collector within collection network 204 has a list of endpoints 104a–104n and other collectors with which it may communicate, with the list being maintained by the routing manager. In uploads to a higher collector, each collector behaves substantially like endpoints 104a–104n.

With reference now to FIG. 3, a diagram of components of a distributed data collection mechanism employed in a collection process in accordance with a preferred embodiment of the present invention is depicted. A "collection," or an upload of return/collection data from a source towards a recipient, is initiated by endpoint 104n. Whenever endpoint 104n wishes to initiate a collection, endpoint 104n contacts the routing manager 110 to which it is assigned to determine the nearest available collector 108n. Routing manager 110 can determine the location of the nearest available collector 108n, which may take into account the priority of the collection, the utilization of the network by other processes, the availability of endpoint 104n.

Endpoint 104n then initiates a collection by transmitting to the collector 108n a Collection Table of Contents (CTOC), a data structure including information about the collection such as source, recipient, priority, time window, and collection identifier (once assigned). The first time a CTOC is submitted to a collector 108n, the CTOC will receive a unique collection identifier utilized to track the progress of the collection in the network.

Upon receiving the CTOC from endpoint 104n, the collector 108n will queue the CTOC for handling. When collector 108n is ready to receive the collection data, collector 108n initiates and upload by informing endpoint 104n that it (collector 108n) is ready. Upon receipt of this ready message, endpoint 104n begins transmitting the collection data to collector 108n in small packets, which collector 108n stores in persistent storage (depot 302).

Once the collection data received from endpoint 104n has all been stored by collector 108n, collector 108n sends a message containing the CTOC to either another collector or the recipient. The collection data remains within collector 108n until requested by a higher level collector or the recipient. Once the upstream collector or recipient is ready to receive the collection data, collector 108n transfers the collection data in the same manner in which it collected the data from endpoint 104n or a downstream collector.

In case of collection failure, a retry mechanism on the upstream collector will re-attempt to upload the collection data. If a collection is broken off in the middle of receiving the collection data, collector 108n attempts to receive the remaining data after a short duration, employing a checkpoint restart from the point at which the collection was interrupted. The sender of the data does not delete any part of the collection data until the entire collection data has been successfully transferred upstream.

Upload of collection data to collectors may be managed to control network loading, and may cooperate with other distributed applications to conserve bandwidth utilization while optimizing the amount of bandwidth employed for collection. If there exists a critical section of the network where collection needs to be controlled, a collector may be placed at the end where data is being received. That collector may then be "turned off" or prohibited from transmitting a ready message to an endpoint or downstream collector during certain blackout periods to disable collection. The network may thus impose restrictions on when data may be transferred across certain critical network facilities in order to conserve bandwidth usage.

For example, activation time window start and duration is only one possible means for controlling when and how long an endpoint will be available to source the collection data to the collector. An alternative, which may be implemented either in lieu of or in addition to the activation time window, is to provide more coarse grain control by specifying, for each collector, a list of endpoints from which that collector may NOT collect data, with each entry specifying either an individual node or a group of nodes. When a CTOC arrives from a node specified within the list, the collector defers collection indefinately. Any external scheduling mechanism may then be utilized with this mechanism to control, in coarse grain fashion, which of the nodes is to be blocked. At the extremes, none or all of the nodes may be blocked.

Figure 4:
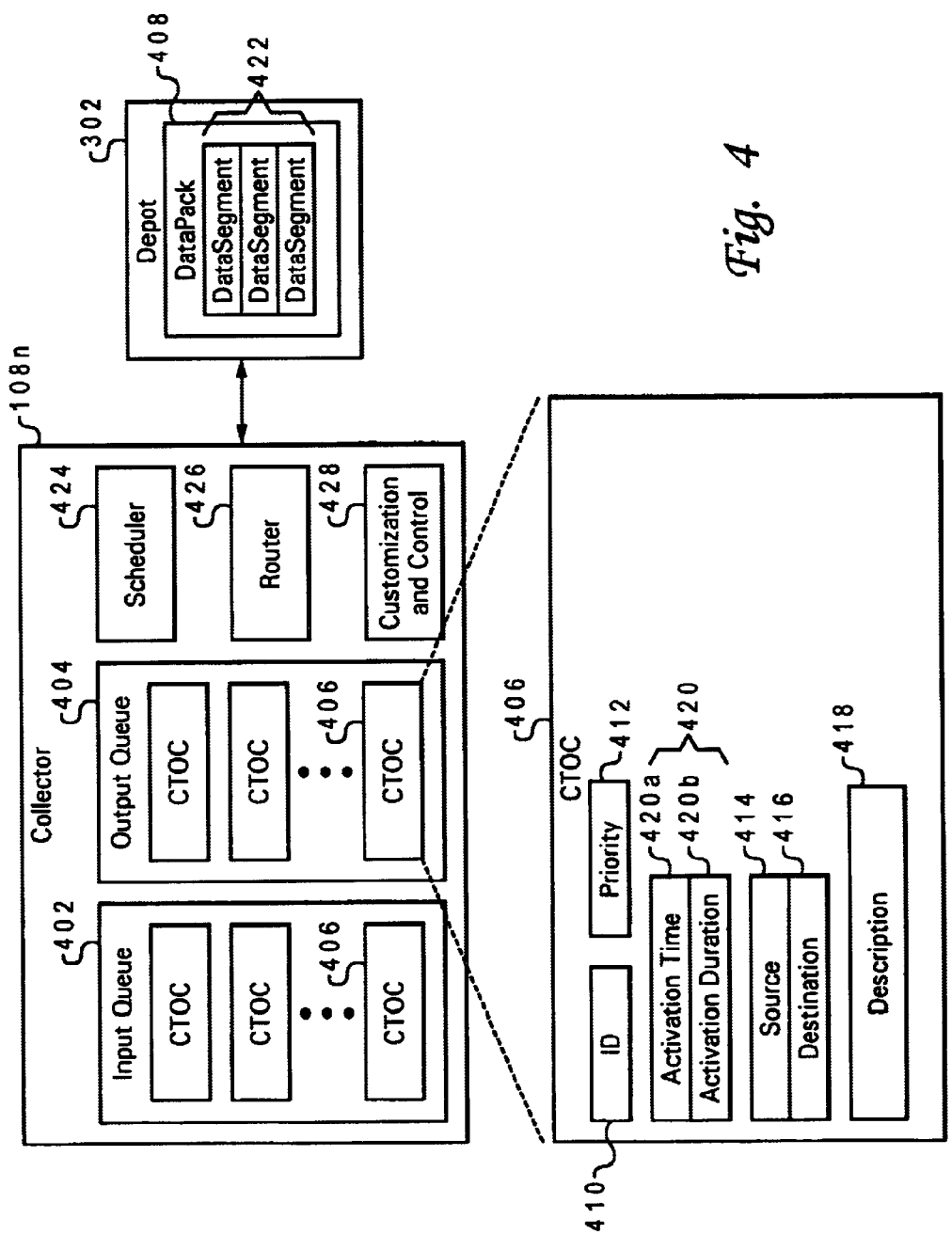
FIG. 4 is a diagram of a collector in accordance with a preferred embodiment of the present invention.

Referring to FIG. 4, a diagram of a collector in accordance with a preferred embodiment of the present invention is illustrated. The collector is a fundamental element of the distributed data collection service of the present invention, and is responsible for storing and forwarding collected data towards the eventual destination. The collector is a mid-level management object having one instance per host, and providing priority-based queuing of collection requests, depoting of collection data, a crash recovery mechanism for collection data transfers, and multi-threaded transfer scheduling of collection requests in the queues.

Collectors are employed in the present invention to perform priority based queueing and dispatch of data from endpoints and downstream collectors, checkpoint and restart functions for the input and output queues and the depot, data forwarding to the upstream node, as well as to enable remote status monitoring and control and distributed error reporting.

Collectors may be connected into a collection network and deployed into a distributed hierarchical network topology to implement a distributed data collection service, a configuration which may be performed either manually or through some network-loading-based algorithm. Collectors in a collection network have topological relationships utilized to control the routing of data from an "injection" point (endpoint interface to collector) in the collection network to the final destination. Route calculations from endpoints to the recipients via particular collectors may be performed either at each collector, or on a global basis, to marshal collection data towards the eventual destination. These route calculations may be based on a static routing map or one that is dynamically evaluated based on network loading.

Each collector 108n includes a priority-based queuing mechanism which initially includes two queues: an input queue 402 to store requests for collection from downstream nodes (endpoints or lower level collectors) and an output queue 404 to hold collection requests which were spooled to upstream collectors for pickup. Queues 402 and 404 are maintained in sorted order with the primary sort key being the CTOC priority, which ranges from priority level 0 up to priority level 4.

The secondary sort key within a given priority level is the CTOC's activation time—that is, the time at which the node is available for servicing data transfer requests. The tertiary sort key within a given priority level and a given pickup time is the activation duration for which the node is available to service data transfer requests. Alternatively, additional sorting beyond the primary sort may be applied by providing function hooks.

Queues 402 and 404 essentially store CTOC elements, and can be checkpointed and restarted from a disk file to allow crash recovery of the collection service and the user data for which transfer was in progress. Checkpoint-restart of queues 402 and 404 utilizes Interface Definition Language (IDL) serialization to write and read ASN.1/BER streams to and from the disk. Queues 402 and 404 are preferably thread-safe implementations, as is a retry queue (not shown) if needed.

The data representations employed by collector 108n are implementing in accordance with the key-value pairs approach to store and retrieve data by name, and with backwards binary compatibility from an IDL standpoint. The primary and essential data representations employed are the CTOC 406 and the data pack 408. These data representations possess persistence properties as well as the ability to cross system and process boundaries, and may be implemented in IDL or EIDL.

CTOC 406 forms the "header" portion of collection data, which is utilized by both data-generation endpoints and intermediate collector nodes in the collection network to inform upstream nodes of the availability of the data for pickup. CTOC 406 is employed by endpoints and collectors to negotiate data transfer requests.

CTOC 406 contains a unique identifier 410 for system-wide tracking of the progress of the collection data through the collection network, assigned when the CTOC is first submitted by the data-generation endpoint. CTOC 406 also contains a priority 412 associated with the collection data, which may be from level 0 up to level 4 in the exemplary embodiment.

CTOC 406 also includes source and destination object identifiers 414 and 416 for routing the collection data, and a DataPack component 418 which describes the actual data by, e.g., size and location of files, data compression information, if any, and data encryption information, if any.

CTOC 406 also contains an activation time window 420, a "window of opportunity" when the node is available for servicing data transfer request.

Activation time window 420 is encoded in two fields: an activation time field 420a which specifies the earliest time at which the node is available to service data transfer requests; and an activation duration field 420b which places a limit on how long the node will be available to service data transfer requests, starting from the activation time.

The activation time window 420 may be employed both for bandwidth utilization control on the collection network and for handling endpoints, such as mobile systems, which are only intermittently connected to the collection network.

The other essential data representation employed by collector 108n is data pack 408, which is the "data" part of the collection dataset and which, together with constituent data segments 422, contains an encoded form of the actual collection data for pickup and delivery. Data pack 408 represents the atomic unit for collection data. A data pack 408 may contain multiple data segments 422 each corresponding to a file and containing, for example, the file path, the file name, and the file attributes such as compression flags, checksums, and encryption information. Data packs 408 and data segments 422 are designed to model arbitrary collections of data, file-based or otherwise.

Collector 108n also includes or employs other components. The persistent storage or "depot" 302 accessible to collector 108n provides intermediate staging of the collection data while in transit, which offers two benefits: first, the data transmission cycle may be spread out more evenly, allowing better bandwidth utilization management of the collection network as well as reducing the instantaneous loading on the end application (the recipient) and thereby increasing scalability; and, second, reliability is increased since the data can now take advantage of crash recovery mechanisms available in the collection service.

Collection data in the form of data packs 408 and data segments 422 are stored on disk within depot 302. Depot 302 maintains an indexed archive of data packs 408 on disk, indexed utilizing the CTOC identifier 410 for the collection data. Depot 302 also implements thread-safety and crash-recovery mechanisms.

Collector 108n also includes a scheduler 424, an active agent which manages the queues 402 and 404 and depot 302. Scheduler 424 services CTOCs 406 from input queue 402, stores and retrieves collection data from depot 302, and propagates collection data upstream to the next collector node.

Scheduler 424 is a multi-threaded implementation which employs socket-based Inter-Object Message (IOM) channels for actual transmission of collection data, with network-bandwidth control mechanisms to regulate flow. Scheduler 424 also employs IOM to transfer data from downstream nodes to the local depot 302. Locally resident CTOCs 406 are then routed by scheduler 424 to the next upstream collector and placed in output queue 404 until the collection data is picked up.

Collector 108n also includes a router 426 which consults the topology management daemon (routing manager) and performs calculations based on the source and recipient identifiers 414 and 416 necessary to determine the next upstream collector node within the collection network for the CTOC. Router 426 may cache frequently utilized routes to minimize network traffic. Router 426 also optimizes transmission of the collection data to the next upstream node for bandwidth utilization by controlling the activation time and duration fields 420a–420b in the CTOC 406.

Finally, collector 108n includes a customization and control module 428 to support status monitoring and the ability to stop any particular collector in the collection network and drain its queues. Also provided are mechanisms which help construct a topology view of the collection network in a graphical fashion, with state and control information for individual collectors. This feature is utilized by administrators to monitor and fine-tune the collection network. Additional hooks may be provided within collector 108n to permit other distributed applications to utilize collection services.

Figure 5:
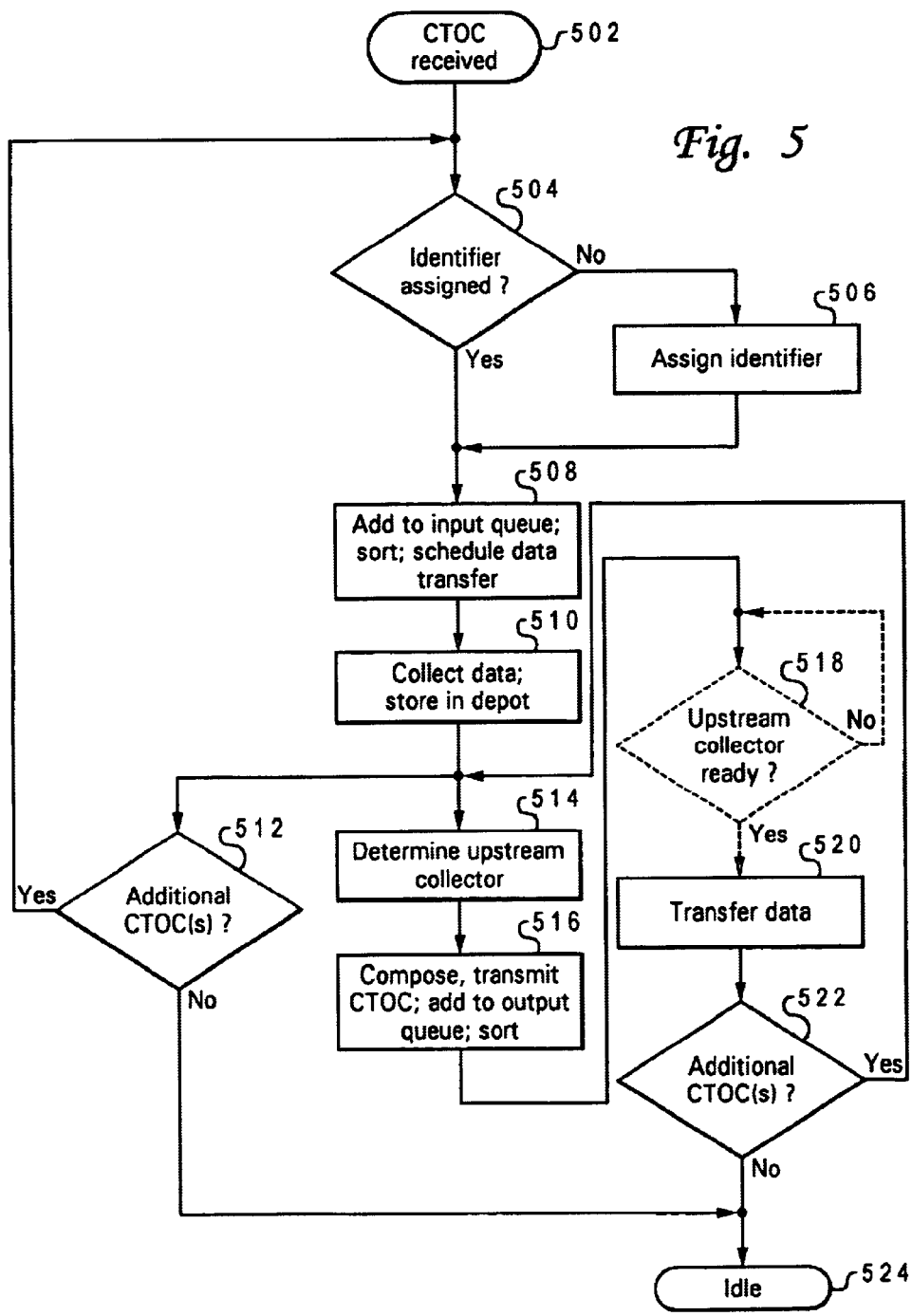
FIG. 5 depicts a high level flow chart for a process of employing a collector within a distributed collection process in accordance with a preferred embodiment of the present invention.
Figure 6:
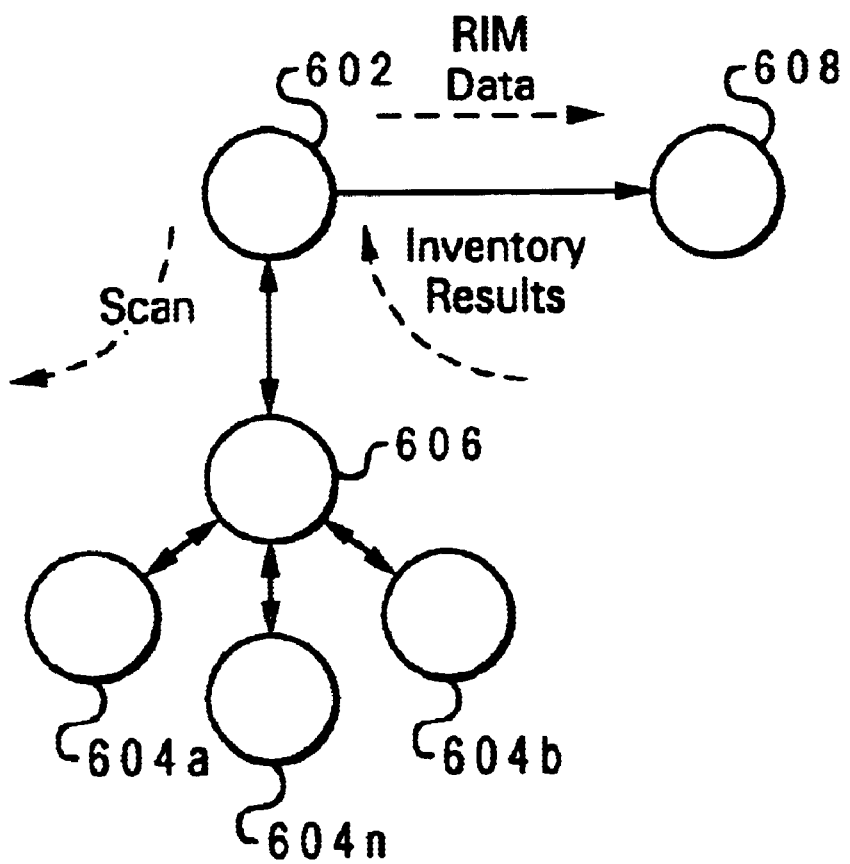
FIG. 6 is a diagram of a distributed data collection mechanism in accordance with the known art.

With reference now to FIG. 5, a high level flow chart for a process of employing a collector within a distributed collection process in accordance with a preferred embodiment of the present invention is depicted. The process begins at step 502, which depicts a CTOC being received by the collector from an endpoint or downstream collector, indicating that data is available for collection.

The process then passes to step 504, which illustrates a determination of whether an CTOC identifier has been previously assigned to the received CTOC, by examining the identifier field. If not (i.e., this is the first time the CTOC was transmitted), the process proceeds to step 506, which depicts assigning an identifier to the received CTOC, which is then stored within the CTOC.

If a CTOC identifier was previously assigned, or once a CTOC identifier is assigned, the process proceeds to step 508, which illustrates adding the CTOC to the input queue of the collector, sorting the input queue (by priority first, and then by activation time window) to achieve proper placement of the received CTOC among other CTOCs in the input queue, and scheduling a data transfer of the associated collection data based on the position of the CTOC within the input queue and the downstream bandwidth utilization.

The process next passes to step 510, which depicts collecting the collection data corresponding to the received CTOC from the endpoint or downstream collector, and storing the collection data within the depot associated with the collector. For a multi-threaded process, the process next passes to step 512, which illustrates a determination of whether additional CTOCs are queued for collection. If so, the process returns to step 504 to begin working on another CTOC; otherwise the active thread retires.

From step 510 the process then also passes to step 514, which illustrates determining an upstream collector for the collection data from the collection network topology maintained by the routing manager. The route (i.e., the upstream collector) may be fixed, or may depend upon current loading conditions.

The process passes next to step 516, which depicts composing a CTOC for the collection data. Essentially all fields within the CTOC should remain unchanged except the activation time window, which is set by the collector based on the loading at the collector and the priority of other CTOCs being serviced by the collector. The CTOC is then transmitted to the upstream collector and added to the collector's output queue, which is also sorted by priority.

The process then passes to step 518, which illustrates a determination of whether the upstream collector is ready to receive the collection data, based on whether the upstream collector has returned a ready signal. If not, the process returns to step 518 and the collector continues to wait until the upstream collector is ready for collection data corresponding to the received CTOC. Meanwhile the collector may be transferring collection data corresponding to other CTOCs within the output queue of the collector.

Step 518 is not intended to imply that some process within the endpoint or downstream collector actually idles while waiting for the upstream collector to be ready to receive the collection data. In practice, the process that initiated the data collection terminates. The upstream collector initiates a process to effect the data transfer within the endpoint or downstream collector at any point after receiving the CTOC. The system relies on the fact that no endpoint need be waiting for an upstream collector to collect data, but is instead asynchronous, in order to improve data collection efficiency.

Like the collector when picking up the collection data from the endpoint or downstream collector, the upstream collector schedules transfer of the collection data based on the position of the transmitted CTOC within its input queue, the activation time window in the transmitted CTOC, and network loading between the collector and the upstream collector. When the scheduled pick-up is reached, the upstream collector sends a ready signal to the collector.

Once the upstream collector is ready to receive the collection data corresponding to the transmitted CTOC, the process proceeds to step 520, which depicts the collector transferring the collection data to the upstream collector. The data transfer may be controlled by the upstream collector, and is accomplished by transfer of data packs and data segments. For multi-thread processes, the process then passes to step 522, which illustrates a determination of whether additional CTOCs are queued and ready for upstream collection. If so, the process returns to step 514 and determines the upstream collector to which the next collection data packet should be sent. Otherwise, the process then passes to step 524, which illustrates the collector becoming idle until another CTOC is received from an endpoint or downstream collector.

The present invention provides a collector for efficient collection of data from endpoints and downstream collector nodes in a distributed data collection network, together with automated data forwarding to the next upstream collector. Separate input and output queues are employed for data transfers from endpoints and downstream collector nodes and for data transfers to upstream collector nodes. Priority based queuing and control over activation time windows, which specify when the downstream node will be available to service data transfer requests, permit management of network bandwidth utilization.

Data is collected from the endpoints and downstream collector nodes in the form of data packs and data segments, which model file-based or other arbitrary collections of data. The collection data is stored in a depot accessible to the collector, with checkpoint and restart functionality supported for the queues and the depot. Remote status monitoring and control are enabled, and distributed error reporting may be utilized.

The present invention provides an asynchronous collection mechanism in which data collection is controlled by the individual collector. Data is transferred utilizing a direct channel and is stored in depots established to hold collected data. The data collection mechanism allows checkpoint restarts, blackout windows, and bandwidth utilization control.

The present invention may be utilized in a distributed collection network in which the topology is configurable and may be dynamically modified at run time based on loading conditions by specifying routing for particular packets of collection data according to regional traffic on all alternative paths between the source and recipient. Data collection autonomously originates with data generation endpoints and is asynchronously timed, within an activation window specified by the endpoints, based on local conditions within an upstream collector for a next immediate hop. Scheduling of collection data hops is performed locally without global timing constraints.

The present invention is well-suited for data collection from mobile endpoints. The user of the mobile endpoint may trigger an autonomous scan for collection data within the mobile endpoints by logging on to a network. The mobile system formulates a CTOC for the collection data, specifying an activation window with, perhaps, some input from the user regarding how long the user intends to remain logged onto the network. The priority for the CTOC may also be set based on whether the endpoint is mobile and/or intermittently unavailable or always on and always connected. The routing for the next data hop is optimized by a central collection routing manager for local traffic and available alternative paths to the intended recipient, but scheduling is based on local conditions without global timing controls.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of providing a collector for a distributed data collection process, comprising:

providing an input queue for data structures received from an endpoint or downstream collector, wherein the data structures correspond to collection data available at the endpoint or downstream collector;

providing a depot for storing collection data collected from the endpoint or downstream collector in response to receiving a corresponding data structure from the endpoint or downstream collector;

providing an output queue for data structures corresponding to collection data within the depot to be transferred to an upstream node; and configuring the input queue to sort data structures within the input queue which correspond to collection data available at an endpoint or downstream collector based primarily on a priority and secondarily on an activation time window specified within each data structure.

2. The method of claim 1, further comprising:

configuring the collector to schedule collection of the collection data from the endpoint or downstream collector based on:

a priority specified within the data structure relative to a priority specified within other data structures within the input queue, an activation time window specified within the data structure, and network loading between the collector and the endpoint or downstream collector.

3. The method of claim 1, further comprising:

configuring the collector to formulate a new data structure upon completing collection of the collection data from the endpoint or downstream collector, wherein the new data structure corresponding to the collection data specifies an activation time window during which the collector will be available to service data transfer requests for the collection data from an upstream collector.

4. The method of claim 1, wherein the collector performs priority based queueing and dispatch of data from endpoints and downstream collectors.

5. The method of claim 1, wherein the collector performs checkpoint and restart functions for the input and output queues and the depot.

6. The method of claim 1, wherein the collector performs data forwarding to the upstream node.

7. The method of claim 1, wherein the collector enables remote status monitoring and control.

8. The method of claim 1, wherein the collector enables distributed error reporting.

9. A method of employing a collector in a distributed data collection process, comprising:

receiving a first collection data structure at the collector from an endpoint or downstream collector, wherein the collection data structure corresponds to collection data available at the endpoint or downstream collector;

queuing the first collection data structure in an input queue within the collector;

sorting collection data structures within the input queue primarily on a priority and secondarily on an activation time window specified within each collection data structure:

collecting the collection data corresponding to the first collection data structure from the endpoint or downstream collector;

storing the collection data in persistent storage associated with the collector; and transmitting a second collection data structure corresponding to the stored collection data from the collector to an upstream node.

10. The method claim 9, further comprising:

queuing the second collection data structure in an output queue within the collector.

11. The method claim 9, further comprising:

scheduling collection of the collection data corresponding to the first collection data structure from the endpoint or downstream collector based on:

a priority specified within the first collection data structure relative to priorities specified in any other collection data structures within the input queue, and an activation time window specified within the first collection data structure.

12. The method claim 9, wherein the step of transmitting a second collection data structure corresponding to the stored collection data from the collector to an upstream node further comprises:

determining an upstream collector to which the collection data should be routed.

13. A collector for a distributed data collection process, comprising:

an input queue for data structures received from an endpoint or downstream collector, wherein the data structures correspond to collection data available at the endpoint or downstream collector and wherein the input queue is configured to sort data structures within the input queue which correspond to collection data available at an endpoint or downstream collector based primarily on a priority and secondarily on an activation time window specified within each data structure;

a depot for storing collection data collected from the endpoint or downstream collector in response to receiving a corresponding data structure from the endpoint or downstream collector; and an output queue for data structures corresponding to collection data within the depot to be transferred to an upstream node.

14. The collector of claim 13, wherein the collector is configured to schedule collection of the collection data from the endpoint or downstream collector based on:
   a priority specified within the data structure relative to a priority specified within other data structures within the input queue,
   an activation time window specified within the data structure, and
   network loading between the collector and the endpoint or downstream collector.

15. The collector of claim 13, wherein the collector is configured to formulate a new data structure upon completing collection of the collection data from the endpoint or downstream collector, wherein the new data structure corresponding to the collection data specifies an activation time window during which the collector will be available to service data transfer requests for the collection data from an upstream collector.

16. A system for employing a collector in a distributed data collection process, comprising:
   means for receiving a first collection data structure at the collector from an endpoint or downstream collector, wherein the collection data structure corresponds to collection data available at the endpoint or downstream collector;
   means for queuing the first collection data structure in an input queue within the collector;
   means for sorting collection data structures within the input queue primarily on a priority and secondarily on an activation time window specified within each collection data structure;
   means for collecting the collection data corresponding to the first collection data structure from the endpoint or downstream collector;
   means for storing the collection data in persistent storage associated with the collector; and
   means for transmitting a second collection data structure corresponding to the stored collection data from the collector to an upstream node.

17. The system of claim 16, further comprising:
means for queuing the second collection data structure in an output queue within the collector.

18. The system of claim 16, further comprising:
means for scheduling collection of the collection data corresponding to the first collection data structure from the endpoint or downstream collector based on:
   a priority specified within the first collection data structure relative to priorities specified in any other collection data structures within the input queue, and
   an activation time window specified within the first collection data structure.

19. The system of claim 16, wherein the means for transmitting a second collection data structure corresponding to the stored collection data from the collector to an upstream node further comprises:
   means for determining an upstream collector to which the collection data should be routed.

20. A computer program product within a computer usable medium for providing a collector for a distributed data collection process, comprising:
   instructions for providing an input queue for data structures received from an endpoint or downstream collector, wherein the data structures correspond to collection data available at the endpoint or downstream collector;
   instructions for providing a depot for storing collection data collected from the endpoint or downstream collector in response to receiving a corresponding data structure from the endpoint or downstream collector;
   instructions for providing an output queue for data structures corresponding to collection data within the depot to be transferred to an upstream node; and
   instructions for configuring the input queue to sort data structures within the input queue which correspond to collection data available at an endpoint or downstream collector based primarily on a priority and secondarily on an activation time window specified within each data structure.

21. The computer program product of claim 20, further comprising:
   instructions for configuring the collector to schedule collection of the collection data from the endpoint or downstream collector based on:
      a priority specified within the data structure relative to a priority specified within other data structures within the input queue,
      an activation time window specified within the data structure, and
      network loading between the collector and the endpoint or downstream collector.

22. The computer program product of claim 20, further comprising:
   instructions for configuring the collector to formulate a new data structure upon completing collection of the collection data from the endpoint or downstream collector, wherein the new data structure corresponding to the collection data specifies an activation time window during which the collector will be available to service data transfer requests for the collection data from an upstream collector.

23. A computer program product within a computer usable medium for employing a collector in a distributed data collection process, comprising:
   instructions for receiving a first collection data structure at the collector from an endpoint or downstream collector, wherein the collection data structure corresponds to collection data available at the endpoint or downstream collector;
   instructions for queuing the first collection data structure in an input queue within the collector;
   instructions for sorting collection data structures within the input queue primarily on a priority and secondarily on an activation time window specified within each collection data structure;
   instructions for collecting the collection data corresponding to the first collection data structure from the endpoint or downstream collector;

instructions for storing the collection data in persistent storage associated with the collector; and instructions for transmitting a second collection data structure corresponding to the stored collection data from the collector to an upstream node.

24. The computer program product of claim 23, further comprising:

instructions for queuing the second collection data structure in an output queue within the collector.

25. The computer program product of claim 24, further comprising:

instructions for scheduling collection of the collection data corresponding to the first collection data structure from the endpoint or downstream collector based on:

a priority specified within the first collection data structure relative to priorities specified in any other collection data structures within the input queue, and an activation time window specified within the first collection data structure.

26. The computer program product of claim 24, wherein the instructions for transmitting a second collection data structure corresponding to the stored collection data from the collector to an upstream node further comprise:

instructions for determining an upstream collector to which the collection data should be routed.

* * * * *